United States Patent
Kase et al.

(12)

(10) Patent No.: US 9,231,250 B2
(45) Date of Patent: Jan. 5, 2016

(54) NICKEL-COBALT-MANGANESE COMPOSITE HYDROXIDE AND METHOD FOR MANUFACTURING SAME

(71) Applicant: SUMITOMO METAL MINING CO., LTD., Tokyo (JP)

(72) Inventors: Katsuya Kase, Ehime (JP); Yasutaka Kamata, Ehime (JP); Hideo Sasaoka, Ehime (JP); Tomomichi Nihei, Ehime (JP); Takuya Yamauchi, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/380,151

(22) PCT Filed: Feb. 15, 2013

(86) PCT No.: PCT/JP2013/053633
§ 371 (c)(1),
(2) Date: Aug. 21, 2014

(87) PCT Pub. No.: WO2013/125451
PCT Pub. Date: Aug. 29, 2013

(65) Prior Publication Data
US 2015/0024207 A1    Jan. 22, 2015

(30) Foreign Application Priority Data
Feb. 21, 2012    (JP) .................................. 2012-035585

(51) Int. Cl.
*H01M 4/525* (2010.01)
*H01M 4/505* (2010.01)
*C01G 53/00* (2006.01)

(52) U.S. Cl.
CPC ............. *H01M 4/525* (2013.01); *C01G 53/006* (2013.01); *C01G 53/40* (2013.01); *H01M 4/505* (2013.01); *C01P 2006/11* (2013.01); *C01P 2006/12* (2013.01); *C01P 2006/40* (2013.01); *C01P 2006/80* (2013.01)

(58) Field of Classification Search
CPC .... H01M 4/525; H01M 4/505; C01G 53/006; C01G 53/40; C01P 2006/11; C01P 2006/12; C01P 2006/80; C01P 2006/40
USPC ......................................... 428/402; 252/182.1
See application file for complete search history.

(56) References Cited

U.S. PATENT DOCUMENTS

| | | | |
|---|---|---|---|
| 6,875,416 B1 | 4/2005 | Benz et al. | |
| 8,999,573 B2* | 4/2015 | Kase et al. | ..................... 429/211 |
| 2004/0234857 A1* | 11/2004 | Shiozaki et al. | ............ 429/231.3 |
| 2006/0177739 A1* | 8/2006 | Endo et al. | ............... 429/231.95 |
| 2008/0032196 A1 | 2/2008 | Park et al. | |
| 2009/0035659 A1* | 2/2009 | Takeuchi et al. | .............. 429/223 |

FOREIGN PATENT DOCUMENTS

| | | | |
|---|---|---|---|
| EP | 2 720 305 A1 | | 4/2014 |
| JP | A-2003-059490 | | 2/2003 |
| JP | 2005-149867 | * | 6/2005 |
| JP | A-2005-149867 | | 6/2005 |
| JP | 2006-040715 | * | 2/2006 |
| JP | A-2006-040715 | | 2/2006 |
| JP | 2006-310181 | * | 11/2006 |
| JP | A-2006-310181 | | 11/2006 |
| JP | A-2008-195608 | | 8/2008 |
| JP | 2008-293988 | * | 12/2008 |
| JP | A-2008-293988 | | 12/2008 |
| JP | 2009-059711 | * | 3/2009 |
| JP | A-2009-059711 | | 3/2009 |
| WO | WO03/044881 | * | 5/2003 |
| WO | WO 03/044881 A1 | | 5/2003 |
| WO | WO2005/008812 | * | 1/2005 |
| WO | WO 2005/008812 A1 | | 1/2005 |

OTHER PUBLICATIONS

May 21, 2013 International Search Report issued in International Application No. PCT/JP2013/053633.
Sep. 9, 2015 Extended European Search Report issued in European Application No. 13752288.4.

* cited by examiner

*Primary Examiner* — Leszek Kiliman
(74) *Attorney, Agent, or Firm* — Oliff PLC

(57) ABSTRACT

The present invention provides nickel-cobalt-manganese composite hydroxide and a method for manufacturing same, the nickel-cobalt-manganese composite hydroxide as a precursor allowing a positive electrode active material having excellent battery characteristics and a high-density to be manufactured. The nickel-cobalt-manganese composite hydroxide is represented by a general formula: $Ni_{1-x-y-z}Co_xMn_yM_z(OH)_2$ (wherein $0<x\leq1/3$, $0<y\leq1/3$, $0\leq z\leq0.1$, and M is at least one element selected from Mg, Al, Ca, Ti, V, Cr, Zr, Nb, Mo, and W) and serves as a precursor of a positive electrode active material for nonaqueous electrolyte secondary batteries; wherein the specific surface area measured by a nitrogen adsorption BET method is 1.0 to 10.0 $m^2/g$, the carbon content measured by a high frequency combustion infrared absorption method is not more than 0.1% by mass, and the half-value width of a plane in X-ray diffraction is not more than 1.5°.

10 Claims, 1 Drawing Sheet

NICKEL-COBALT-MANGANESE COMPOSITE HYDROXIDE AND METHOD FOR MANUFACTURING SAME

FIELD OF THE INVENTION

The present invention relates to a method for manufacturing nickel-cobalt-manganese composite hydroxide to serve as a precursor of a positive electrode active material for non-aqueous electrolyte secondary batteries, particularly, relates to nickel-cobalt-manganese composite hydroxide to serve as a precursor of a positive electrode active material for lithium-ion secondary batteries.

The present application asserts priority rights based on JP Patent Application 2012-35585 filed in Japan on Feb. 21, 2012. The total contents of disclosure of the patent application of the senior filing date are to be incorporated by reference into the present application.

BACKGROUND OF THE INVENTION

With the spread of portable electronic equipment, such as cell phones and notebook-sized personal computers, a small and lightweight secondary battery having a high energy density has been desired. Lithium-ion secondary batteries are secondary batteries suitable for such usage, and research and development thereof have been actively conducted.

Furthermore, also in the automobile field, from the view point of resource and environment, a demand for electric vehicles has been growing and thus, as a power source for electric vehicles and hybrid vehicles, there has been desired a lithium-ion secondary battery which is small and lightweight, has a large discharge capacity, and has good cycle characteristics. Particularly, output characteristics are important for a power source for automobiles, and accordingly a lithium-ion secondary battery having good output characteristics has been desired.

A 4V class high voltage can be achieved by a lithium-ion secondary battery which uses lithium-containing composite oxide, particularly uses lithium-cobalt composite oxide ($LiCoO_2$), being relatively easily synthesized, as a positive electrode material, and therefore the commercialization of the lithium-ion secondary battery as a battery having a high energy density has been progressing. Research and development of the lithium-ion secondary battery using such lithium-cobalt composite oxide have been actively conducted to achieve excellent initial capacity characteristics and cycle characteristics, and various results have been already obtained.

However, lithium-cobalt composite oxide is produced by using an expensive cobalt compound as a raw material, and therefore an increase in cost of the active material and moreover a battery is caused, and accordingly improvement of the active material has been desired. A battery using the lithium-cobalt composite oxide costs considerably higher per capacity than a nickel-metal hydride battery, and therefore is of very limited application. Hence, not only for small secondary batteries for portable electronic equipment currently diffused, but also for large-sized secondary batteries for electric power storage, electric vehicles, and the like, there are great expectations for a decrease in cost of the active material and the resulting realization of manufacturing more inexpensive lithium-ion secondary batteries, and thus it can be said that such realization is industrially significant.

Here, as a new material for a positive electrode active material for lithium-ion secondary batteries, in recent years a 4V class positive electrode active material has attracted attention, which is more inexpensive than lithium-cobalt composite oxide, namely, lithium-nickel-cobalt-manganese composite oxide having a composition of $Li(Ni_{1/3}Co_{1/3}Mn_{1/3})O_2$, the composition being substantially such that an atomic ratio of nickel:cobalt:manganese is 1:1:1. Lithium-nickel-cobalt-manganese composite oxide is not only inexpensive, but also has higher thermal stability than a lithium-ion secondary battery which uses lithium-cobalt composite oxide or lithium-nickel composite oxide as a positive electrode active material, and therefore the development thereof has been actively conducted.

In order for a lithium-ion secondary battery to demonstrate good battery characteristics, lithium-nickel-cobalt-manganese composite oxide serving as a positive electrode active material needs to have an appropriate particle diameter and an appropriate specific surface area, as well as a high density. Furthermore, properties of the surface of the active material in which an electrolyte and lithium ions are interchanged are also important, and little adhesion of impurities, particularly carbon, to the surface is required. Such properties of the positive electrode active material are strongly affected by properties of nickel-cobalt-manganese composite hydroxide serving as a precursor, and therefore the composite hydroxide is also required to have the same properties.

For the composite hydroxide serving as a precursor of a positive electrode active material, various proposals mentioned below have been made. However, there is a problem that, in any of those proposals, a material having a sufficiently high density has not been achieved, in addition, properties of the surface thereof have not been fully taken into consideration.

For example, Patent Literature 1 discloses that a nickel salt solution containing cobalt salt and manganese salt, complexing agent, and alkali metal hydroxide are continuously fed into a reaction vessel in an inert gas atmosphere or under the presence of a reductant, and the resulting crystals are continuously grown and continuously collected, whereby high-density cobalt-manganese coprecipitated nickel hydroxide is obtained, the nickel hydroxide being spherical and having a tap density of not less than 1.5 $g/cm^3$, an average particle diameter of 5 to 20 μm, and a specific surface area of 8 to 30 $m^2/g$. The obtained coprecipitated nickel hydroxide can be used as a raw material for lithium-nickel-cobalt-manganese composite oxide, but, according to the Examples, this coprecipitated nickel hydroxide has a tap density of 1.71 to 1.91 $g/cm^3$, that is, less than 2.0 $g/cm^3$, and hence it cannot be said that the coprecipitated nickel hydroxide has a sufficiently high density. On the other hand, Patent Literature 1 does not mention a specific numerical value of the specific surface area, does not clearly describe the optimization of the specific surface area, and does not mention the carbon content of the composite oxide at all. Therefore, even if this coprecipitated nickel hydroxide is used as a precursor, lithium-nickel-cobalt-manganese composite oxide having good battery characteristics cannot be obtained.

Furthermore, Patent Literature 2 discloses a method for manufacturing lithium-nickel-cobalt-manganese composite oxide, the method comprising: a step wherein, under the presence of a complexing agent in an aqueous solution of pH 9 to 13, a mixed solution of nickel salt, cobalt salt, and manganese salt, the solution substantially having an atomic ratio of nickel:cobalt:manganese of 1:1:1, is reacted with an alkaline solution under an inert gas atmosphere to be coprecipitated, whereby nickel-cobalt-manganese composite hydroxide and/or nickel-cobalt-manganese composite oxide, each substantially having an atomic ratio of nickel:cobalt:manganese of 1:1:1, are obtained; and another step wherein a mixture of hydroxide and/or oxide and a lithium compound is baked at a temperature of not less than 700 degrees C. so that an atomic ratio of the total of nickel, cobalt, and manganese to lithium is substantially 1:1.

Also in this Patent Literature 2, the obtained nickel-cobalt-manganese composite hydroxide has a tap density of 1.95 g/cm$^3$, that is, less than 2.0 g/cm$^3$, while has a specific surface area of 13.5 m$^2$/g, which is very large. Furthermore, Patent Literature 2 does not provide any description about the carbon content of the composite oxide, and thus does not take an adverse effect on battery characteristics into consideration.

The capacity of a lithium-ion secondary battery is dependent on the mass of an active material filled in a battery, and therefore the achievement of lithium-nickel-cobalt-manganese composite oxide having a higher density and being more excellent in battery characteristics than a conventional one allows an excellent battery having a large electric capacitance with a limited volume to be obtained. Particularly, such lithium-nickel-cobalt-manganese composite oxide is advantageous in small secondary batteries for portable electronic equipment and batteries for automobiles, in both of which a space for a battery is limited.

As mentioned above, there has been desired nickel-cobalt-manganese composite hydroxide which allows lithium-nickel-cobalt-manganese composite oxide having excellent thermal stability to have a higher density and achieve improvement in battery characteristics.

PRIOR-ART DOCUMENTS

Patent Document

PTL 1: Japanese Patent Application Laid-Open No. 2008-195608
PTL 2: Japanese Patent Application Laid-Open No. 2003-59490

SUMMARY OF THE INVENTION

The present invention aims to provide nickel-cobalt-manganese composite hydroxide which is capable of achieving a positive electrode active material for nonaqueous electrolyte secondary batteries, the positive electrode active material having a high density and being excellent in battery characteristics as well as thermal stability, and provide an industrial manufacturing method thereof.

In order to solve the above-mentioned problems, the inventors have earnestly studied an impact on powder characteristics of nickel-cobalt-manganese composite hydroxide, and they have then found that the oxygen concentration of an atmosphere with which a reaction solution for crystallization is in contact has a great impact on the powder characteristics, and thereby have accomplished the present invention.

Nickel-cobalt-manganese composite hydroxide according to the present invention which accomplishes the above-mentioned aim is represented by a general formula: Ni$_{1-x-y-z}$Co$_x$Mn$_y$M$_z$(OH)$_2$ (wherein 0<x≤1/3, 0<y≤1/3, 0≤z≤0.1, and M is at least one element selected from Mg, Al, Ca, Ti, V, Cr, Zr, Nb, Mo, and W) and serves as a precursor of a positive electrode active material for nonaqueous electrolyte secondary batteries, wherein the nickel-cobalt-manganese composite hydroxide has a specific surface area of 1.0 to 10.0 m$^2$/g, the specific surface area being measured by nitrogen adsorption BET method; a carbon content of not more than 0.1% by mass, the carbon content being measured by a high frequency combustion infrared absorption method; and a half-value width of a (101) plane in X-ray diffraction of not more than 1.5°.

A method for manufacturing nickel-cobalt-manganese composite hydroxide according to the present invention which accomplishes the above-mentioned aim is a method for manufacturing nickel-cobalt-manganese composite hydroxide which is represented by a general formula: Ni$_{1-x-y-z}$Co$_x$Mn$_y$M$_z$(OH)$_2$ (wherein 0<x≤1/3, 0<y≤1/3, 0≤z≤0.1, and M is at least one element selected from Mg, Al, Ca, Ti, V, Cr, Zr, Nb, Mo, and W) and serves as a precursor of a positive electrode active material for nonaqueous electrolyte secondary batteries, and the method comprises: a crystallization step wherein a mixed solution containing at least nickel salt, cobalt salt, and manganese salt and a solution containing an ammonium ion supply source are fed into a reaction vessel to be mixed, and also a caustic alkaline solution is fed thereinto so as to maintain a pH of 11 to 13 on a basis of liquid temperature of 25 degrees C., whereby a reaction solution is prepared, and nickel-cobalt-manganese composite hydroxide particles are crystallized in the reaction solution; a solid-liquid separation step wherein the crystallized nickel-cobalt-manganese composite hydroxide particles are solid-liquid separated and water-washed; and a drying step wherein the washed nickel-cobalt-manganese composite hydroxide particles are dried, wherein, in the crystallization step, the oxygen concentration of an atmosphere which is in contact with an open surface of the reaction solution, in a reaction vessel, is maintained at not more than 0.2% by volume.

EFFECTS OF INVENTION

The present invention provides a method for manufacturing nickel-cobalt-manganese composite hydroxide, the method being capable of industrially obtaining nickel-cobalt-manganese composite hydroxide which has a specific surface area of 1.0 to 10.0 m$^2$/g, a carbon content of not more than 0.1% by mass, the carbon content being measured by a high frequency combustion infrared absorption method, and a half-value width of the (101) plane in X-ray diffraction of not more than 1.5°, and thus has a high density, high crystallinity, and controlled properties of the surface, and serves as a precursor of a positive electrode active material for nonaqueous electrolyte secondary batteries excellent in thermal stability. The use of lithium-nickel-cobalt-manganese composite oxide obtained by the method for manufacturing nickel-cobalt-manganese composite hydroxide according to the present invention as a positive electrode active material allows a nonaqueous electrolyte secondary battery having excellent battery characteristic as well as excellent thermal stability to be obtained, and thus it can be said that the present invention has an extraordinarily high industrial value.

DETAILED DESCRIPTION OF THE INVENTION

Figure 1:
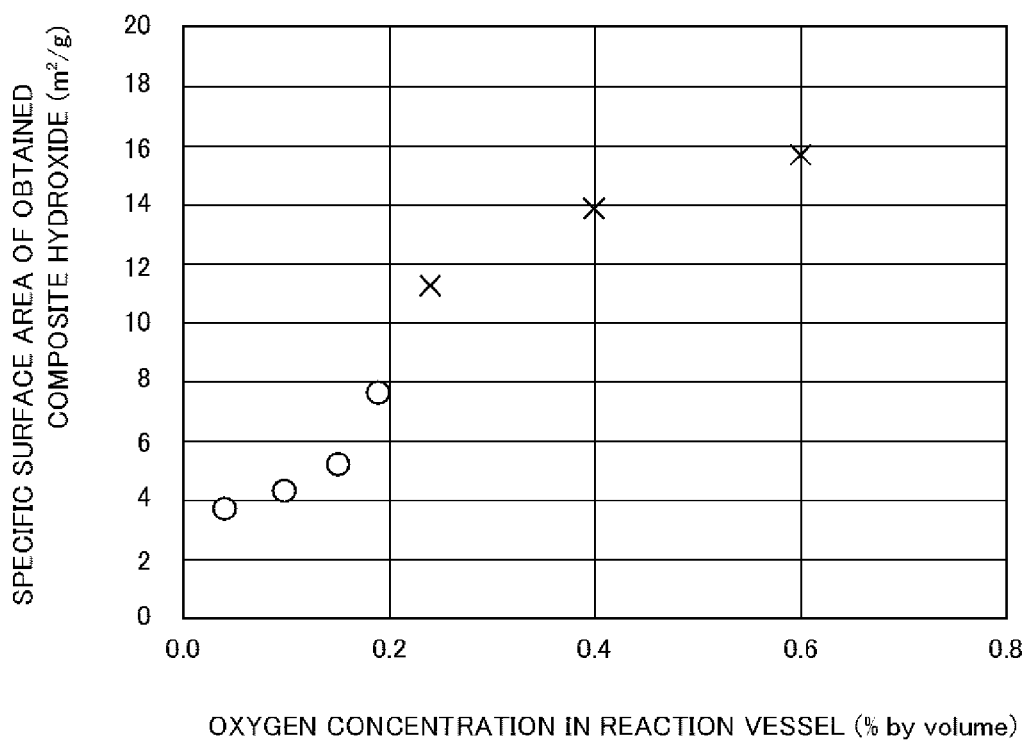
FIG. 1 is a graph showing a relationship between an oxygen concentration in a reaction vessel and a specific surface area of nickel-cobalt-manganese composite hydroxide.

Hereinafter, nickel-cobalt-manganese composite hydroxide according to the present invention and a method for manufacturing the same will be described in detail. It should be noted that the present invention is not particularly limited to the following detailed description, as long as there is no limitation. An embodiment according to the present invention will be described in the following order.

1. Nickel-cobalt-manganese composite hydroxide
2. Method for manufacturing nickel-cobalt-manganese composite hydroxide
   2-1. Crystallization step
   2-2. Solid-liquid separation step
   2-3. Drying step <1. Nickel-Cobalt-Manganese Composite Hydroxide>

The nickel-cobalt-manganese composite hydroxide is represented by a general formula: $Ni_{1-x-y-z}Co_xMn_yM_z(OH)_2$ (wherein $0<x\leq1/3$, $0<y\leq1/3$, $0\leq z\leq0.1$, and M is one kind of element or more selected from Mg, Al, Ca, Ti, V, Cr, Zr, Nb, Mo, and W). The nickel-cobalt-manganese composite hydroxide has a specific surface area of 1.0 to 10.0 m$^2$/g, preferably not less than 1.0 m$^2$/g and less than 8.0 m$^2$/g, the specific surface area being measured by a nitrogen adsorption BET method; a carbon content of not more than 0.1% by mass, the carbon content being measured by a high frequency combustion infrared absorption method; and a half-value width of the (101) plane in X-ray diffraction of not more than 1.5°, preferably not more than 1.2°.

In the case where nickel-cobalt-manganese composite hydroxide has a specific surface area of more than 10.0 m$^2$/g, a finally-obtained positive electrode active material has a too large specific surface area, whereby sufficient safety cannot be achieved. Furthermore, nickel-cobalt-manganese composite hydroxide preferably has a specific surface area of less than 8.0 m$^2$/g so as to obtain a positive electrode active material having both sufficient output and safety. On the other hand, in the case where the nickel-cobalt-manganese composite hydroxide has a specific surface area of less than 1.0 m$^2$/g, a positive electrode active material has a too small specific surface area, and is in insufficient contact with an electrolyte solution when used in a battery, whereby sufficient output cannot be achieved. Hence, the specific surface area of 1.0 to 10.0 m$^2$/g, preferably not less than 1.0 m$^2$/g and less than 8.0 m$^2$/g allows sufficient safety and output of a battery to be achieved.

In the case where nickel-cobalt-manganese composite hydroxide has a carbon content of more than 0.1% by mass, the carbon content being measured by a high frequency combustion infrared absorption method, more impurities are formed in the surface of a positive electrode active material, whereby sufficient output of a battery cannot be obtained. Hence, the carbon content of not more than 0.1% by mass allows a battery having sufficient output to be achieved. The amount of carbon adhering to the nickel-cobalt-manganese composite hydroxide is not more than 0.1% by mass, and a less amount thereof is preferable.

In the case where nickel-cobalt-manganese composite hydroxide has a half-value width of the (101) plane in X-ray diffraction of more than 1.5°, when the nickel-cobalt-manganese composite hydroxide and a lithium compound are baked in order to obtain a positive electrode active material, secondary particles are sintered, thereby becoming coarse, and therefore the obtained positive electrode active material has reduced battery characteristics. In order to sufficiently control the sintering, the half-value width thereof is preferably not more than 1.2°. The lower limit of the half-value width thereof is preferably 0.50. The half-value width thereof of less than 0.5° causes the surface activity of the obtained positive electrode active material to be reduced, whereby sometimes the characteristics of a battery used are not sufficiently obtained.

The crystal properties of nickel-cobalt-manganese composite hydroxide are determined by X-ray diffraction, and the reason for focusing on the (101) plane is that a half-value width of the (101) plane is greatly dependent on manufacturing conditions, especially crystallization reaction conditions. The half-value width of a crystal plane other than the (101) plane may be used as an index, but is less dependent on manufacturing conditions, and sometimes battery characteristics, such as output and capacity, of an obtained positive electrode active material cannot be sufficiently controlled. Thus, the half-value width of the (101) plane in X-ray diffraction of not more than 1.5° can prevent particles from being coarse due to sintering the particles.

An additive element M is to be added in order to improve battery characteristics, such as cycle characteristics and output characteristics. In the case where the atomic ratio z of an additive element M exceeds 0.1, metallic elements which contribute to an oxidation-reduction reaction (Redox reaction) are decreased, and accordingly a battery capacity is reduced, which is not preferable. Therefore, an additive element M is adjusted so that the atomic ratio z thereof is in a range of $0\leq z\leq0.1$.

Uniform distribution of an additive element M in particles of nickel-cobalt-manganese composite hydroxide allows effects of improvement in battery characteristics over the whole of the particles to be obtained. Thus, even a small amount of an additive element M added can achieve effects of improvement in battery characteristics and prevent the capacity of a battery from being reduced. Furthermore, to achieve the effects with a smaller additive amount of an additive element M, the concentration of the additive element M is preferably higher in the surfaces of particles of nickel-cobalt-manganese composite hydroxide than in the interior of the particles.

Furthermore, nickel-cobalt-manganese composite hydroxide has a tap density of not less than 2.0 g/cm$^3$, more preferably 2.0 to 2.5 g/cm$^3$. A tap density of less than 2.0 g/cm$^3$ is not of high density, and therefore, a positive electrode active material obtained from nickel-cobalt-manganese composite hydroxide having such tap density also does not have a high density, whereby battery characteristics cannot be improved. On the other hand, a tap density of more than 2.5 g/cm$^3$ leads to a too large particle diameter and thereby causes a decrease in area in which a positive electrode active material is in contact with an electrolyte, and therefore it is sometimes hard to obtain preferable battery characteristics. Hence, a tap density of not less than 2.0 g/cm$^3$ allows an area in which a positive active material is in contact with an electrolyte not to be reduced; a high density to be achieved; and battery performance to be improved.

Furthermore, nickel-cobalt-manganese composite hydroxide preferably has an average particle diameter of 5 to 25 μm. In the case where nickel-cobalt-manganese composite hydroxide has an average particle diameter of less than 5 μm, the specific surface area thereof is sometimes too large. Furthermore, aggregation of particles due to sintering thereof is sometimes caused at the time of manufacturing a positive electrode active material. On the other hand, in the case where nickel-cobalt-manganese composite hydroxide has an average particle diameter of more than 25 μm, the specific surface area thereof is sometimes too small. Furthermore, application properties of a positive electrode active material to a current collector are reduced. Hence, the average particle diameter of 5 to 25 μm allows the particle aggregation at the time of manufacturing a positive electrode active material to be controlled; application properties of the positive electrode active material to a current collector not to be reduced; and thereby battery performance to be improved.

The above-mentioned nickel-cobalt-manganese composite hydroxide has a specific surface area of 1.0 to 10.0 m$^2$/g, preferably not less than 1.0 m$^2$/g and less than 8.0 m$^2$/g, the specific surface area being measured by a nitrogen adsorption BET method; a carbon content of not more than 0.1% by mass, the carbon content being measured by a high frequency combustion infrared absorption method; and a half-value width of the (101) plane in X-ray diffraction of not more than 1.5°, preferably not more than 1.2°, whereby a positive electrode active material having excellent thermal stability, excellent battery characteristics, and a high density can be manufactured. Furthermore, to improve battery performance, the nickel-cobalt-manganese composite hydroxide preferably has a tap density of not less than 2.0 g/cm$^3$ and an average particle diameter of 5 to 25 μm.

The nickel-cobalt-manganese composite hydroxide is suitable as a precursor of a positive electrode active material for nonaqueous electrolyte secondary batteries, and by using a common manufacturing method, the nickel-cobalt-manganese composite hydroxide can be made into a positive electrode active material for nonaqueous electrolyte secondary batteries. For example, nickel-cobalt-manganese composite hydroxide as it is or after heat-treated at a temperature of not more than 800 degrees C., the nickel-cobalt-manganese composite hydroxide is mixed with a lithium compound in such a way as to have preferably an atomic ratio of lithium of 0.95 to 1.5 with respect to metallic elements of the composite hydroxide, and baked at a temperature of 800 to 1000 degrees C. A nonaqueous electrolyte secondary battery by using the obtained positive electrode active material has a high capacity and a good cycle characteristic and is excellent in battery characteristics and safety.

<2. Method for Manufacturing Nickel-Cobalt-Manganese Composite Hydroxide>

A method for manufacturing the above-mentioned nickel-cobalt-manganese composite hydroxide comprises: a crystallization step wherein a mixed solution containing at least nickel salt, cobalt salt, and manganese salt and a solution containing an ammonium ion supply source are fed into a reaction vessel to be mixed, and also a caustic alkaline solution is fed thereinto so as to maintain a pH of 11 to 13 on a basis of liquid temperature of 25 degrees C., whereby a reaction solution is prepared, and then, with the oxygen concentration of an atmosphere in contact with an open surface of the reaction solution in a reaction vessel being maintained at not more than 0.2% by volume, nickel-cobalt-manganese composite hydroxide particles are crystallized in the reaction solution; a solid-liquid separation step wherein the crystallized nickel-cobalt-manganese composite hydroxide particles are solid-liquid separated and water-washed; and a drying step wherein the washed nickel-cobalt-manganese composite hydroxide particles are dried. The method for manufacturing nickel-cobalt-manganese composite hydroxide allows the specific surface area and the carbon content of nickel-cobalt-manganese composite hydroxide to be reduced and also crystallinity thereof to be improved. Hereinafter, each of the steps in the method for manufacturing nickel-cobalt-manganese composite hydroxide will be described in detail.

(2-1. Crystallization Step)

The crystallization step is performed in such a manner that a mixed solution containing at least nickel salt, cobalt salt, and manganese salt and a solution containing an ammonium ion supply source are fed into a reaction vessel to be mixed, and also a caustic alkaline solution is fed thereinto so as to maintain a pH of 11 to 13 on a basis of liquid temperature of 25 degrees C., whereby a reaction solution is prepared, and then, with the oxygen concentration of an atmosphere in contact with an open surface of the reaction solution in a reaction vessel being maintained at not more than 0.2% by volume, nickel-cobalt-manganese composite hydroxide particles are crystallized in the reaction solution.

The nickel-cobalt-manganese composite hydroxide obtained in the crystallization step is represented by a general formula: $Ni_{1-x-y-z}Co_xMn_yM_z(OH)_2$ (wherein $0<x\le1/3$, $0<y\le1/3$, $0\le z\le0.1$, and M is one kind of element or more selected from Mg, Al, Ca, Ti, V, Cr, Zr, Nb, Mo, and W) and has an atomic ratio almost corresponds to that of the mixed solution to be supplied. Therefore, adjustment of an atomic ratio of the mixed solution to the atomic ratio in the above-mentioned general formula allows an atomic ratio of nickel, cobalt, manganese, and an additive element M to be in the range of the general formula.

The mixed solution of nickel salt, cobalt salt, and manganese salt preferably has a salt concentration of 1 mol/L to 2.2 mol/L in total of each of the salts. In the case where the mixed solution has a salt concentration of less than 1 mol/L, such low salt-concentration causes insufficient growth of crystals of nickel-cobalt-manganese composite hydroxide. On the other hand, the salt concentration of more than 2.2 mol/L exceeds the saturation concentration at room temperature, and therefore there is a risk, for example, of clogging a pipe with re-precipitated crystals, and in addition, many crystalline nuclei are formed, and lead to many minute particles. Hence, the mixed solution preferably has a salt concentration of 1 mol/L to 2.2 mol/L in total of each of the salts in order that crystals of nickel-cobalt-manganese composite hydroxide are grown and not re-precipitated, and thereby the formation of minute particles is controlled.

Nickel salt, cobalt salt, and manganese salt which are usable are not particularly limited, but preferably at least one of sulfate, nitrate, and chloride.

In the crystallization step, the reaction solution is controlled to have a pH in a range of 11 to 13, preferably a pH in a range of 11 to 12 on a basis of liquid temperature of 25 degrees C. In the case where the reaction solution has a pH of less than 11, nickel-cobalt-manganese composite hydroxide particles are coarse and the average particle diameter thereof exceeds 25 μm, and furthermore, nickel remains in the solution after the reaction, thereby causing the loss of nickel. On the other hand, in the case where the reaction solution has a pH of more than 13, the crystallization speed of nickel-cobalt-manganese composite hydroxide is higher, thereby causing many minute particles to be formed. There is a problem that too many minute particles cause an increase in specific surface area and also cause themselves to be sintered, thereby forming aggregation powder at the time of manufacturing a positive electrode active material. To further decrease minute particles, the reaction solution preferably has a pH of not more than 12.0. Therefore, in order to reduce the loss of nickel, to make nickel-cobalt-manganese composite hydroxide particles neither coarse nor minute, to make the particles have an appropriate diameter, and to prevent aggregation powder from being formed, the reaction solution has a pH in a range of 11 to 13, or preferably a pH in a range of 11 to 12.

The pH of the reaction solution can be controlled by supplying a caustic alkaline solution. The caustic alkaline solution is not particularly limited, and, for example, an alkali metal hydroxide solution, such as sodium hydroxide or potassium hydroxide, may be used. Alkali metal hydroxide may be added directly to the reaction solution, but, is preferably added in the form of aqueous solution due to ease of pH control. A method for adding a caustic alkaline solution is also not particularly limited, and while the reaction solution being sufficiently stirred, a caustic alkaline solution is added so as to have a pH in a range of 11 to 13, by using a pump capable of flow rate control, such as a metering pump.

The reaction solution preferably has an ammonium ion concentration of 5 to 20 g/L. In the case where the reaction solution has an ammonium ion concentration of less than 5 g/L, the solubility of nickel, cobalt, and manganese in the reaction solution is low, and the hydroxide particles are insufficiently crystallized and grown, and therefore a high-density nickel-cobalt-manganese composite hydroxide cannot be obtained. The combination of oxygen concentration and ammonium ion concentration allows the crystals to further sufficiently grow and thereby the nickel-cobalt-manganese composite hydroxide having a low specific surface area to be obtained. Furthermore, in the case where the reaction solution has an ammonium ion concentration of more than 20 g/L, crystallization speed is reduced and productivity is lowered, and also more metal ions, such as nickel ions, remain in the solution, whereby cost is increased. Therefore, in order to obtain nickel-cobalt-manganese composite hydroxide having a high density and good formation properties, the reaction solution preferably has an ammonium ion concentration of 5 to 20 g/L.

An ammonium ion concentration can be controlled by adding an ammonium ion supply source to a reaction solution. The ammonium ion supply source is not particularly limited, but preferably at least one of ammonia, ammonium sulfate, and ammonium chloride.

In the crystallization step, it is important that the oxygen concentration of an atmosphere in contact with an open surface of the reaction solution in a reaction vessel is maintained at not more than 0.2% by volume. With the oxygen concentration being maintained at not more than 0.2% by volume, oxidation of metallic elements, particularly manganese, in the reaction solution is controlled, and primary particles are developed, whereby spherical secondary particles having high crystallinity are obtained, and thus a lower specific surface area and a lower carbon content can be achieved.

In the case where the oxygen concentration exceeds 0.2% by volume, primary particles are not sufficiently developed, thereby the crystallinity is reduced, and therefore the half-value width of the (101) plane in X-ray diffraction exceeds 1.5°. Furthermore, primary particles are minute, thereby resulting in an increase in crystal interface, and accordingly the specific surface area exceeds 10.0 m$^2$/g, and more carbon adsorbs to the interfaces, and as a result, the carbon content exceeds 0.1% by mass. The lower limit of the oxygen concentration is not particularly limited, and, as the oxygen concentration is lower, the specific surface area and the carbon content are also lower, and therefore it is beneficial that oxygen concentration is not more than 0.2% by volume so as to be controlled the desired specific surface area and carbon content within an industrially feasible range.

The control of the oxygen concentration in a reaction vessel is performed preferably, for example, by feeding inert gas into a reaction vessel due to its easiness. Here, the feeding inert gas into a reaction vessel needs to be performed in such a manner that a sufficient amount of inert atmosphere gas is supplied or continues to be supplied during crystallization so as to maintain the oxygen concentration at not more than 0.2% by volume. It should be noted that, if the oxygen concentration is lowered too much by the supply of too much amount of inert atmosphere, primary particles are sometimes developed too much. Therefore, for example, by adjusting the amount of inert gas fed into a reaction vessel having a lid, the oxygen concentration can be easily controlled.

In the crystallization step, in the case where the oxygen concentration is not maintained at not more than 0.2% by volume, by feeding inert gas into a reaction vessel, as long as oxidation of metallic elements is controlled, primary particles are developed to some extent and secondary particles also become large, so that the particle density and the tap density of powder are improved. However, the specific surface area and the carbon content have a close relationship with the interfaces of primary particles, and therefore, unless the oxygen concentration is controlled, it is difficult that the specific surface area and the carbon content are controlled to be in a good range.

It is beneficial that the oxygen concentration is maintained at not more than 0.2% by volume, and the control method thereof is not particularly limited, but, in the case where the oxygen concentration is controlled by the supply of inert gas, the use of nitrogen gas as inert gas has an advantage in cost and thus is preferable.

Furthermore, in the crystallization step, the temperature of the reaction solution is preferably maintained at 20 to 70 degrees C. In this way, crystals of nickel-cobalt-manganese composite hydroxide grow. In the case where the reaction solution has a temperature of less than 20 degrees C., the reaction solution has a low solubility of salt and thereby has a low salt-concentration, the crystals of nickel-cobalt-manganese composite hydroxide sometimes insufficiently grow. On the other hand, in the case where the reaction solution has a temperature of more than 70 degrees C., many crystal nuclei are formed, thereby leading to the presence of many minute particles, and therefore sometimes nickel-cobalt-manganese composite hydroxide particles do not have a low specific surface area. Therefore, in order to sufficiently grow crystals and to achieve high-density particles, the reaction solution preferably has a temperature of 20 to 70 degrees C.

Here, in the case where an additive element M, (hereinafter, referred to as an additive element M) is added to nickel-cobalt-manganese composite hydroxide, there is a method for uniformly dispersing the additive element M in the interior of the composite hydroxide particles, or, in addition, coating the additive element M on the surfaces of the particles. In the case where the additive element M is uniformly dispersed in the interior of the composite hydroxide particles, it is beneficial to add an additive containing the additive element M to a mixed solution in the crystallization step, whereby, while the additive element M being dispersed in the interior of the composite hydroxide particles, coprecipitation can be performed.

As a water-soluble compound, the additive element M is preferably added to the mixed solution, and examples of the additive element M to be used include titanium sulfate, ammonium peroxotitanate, titanium potassium oxalate, vanadium sulfate, ammonium vanadate, chromium sulfate, potassium chromate, zirconium sulfate, zirconium nitrate, niobium oxalate, ammonium molybdate, sodium tungstate, and ammonium tungstate.

Furthermore, in the case of not only adding an additive element M to the interior of nickel-cobalt-manganese composite hydroxide particles but also coating the surfaces of the particles with the additive element M, for example, the nickel-cobalt-manganese composite hydroxide particles are slurried in an aqueous solution containing the additive element M, and, while controlling the pH to a predetermined value, an aqueous solution containing one kind of additive elements M or more is added thereto, and, by a crystallization reaction, the additive element M is precipitated on the surfaces of the nickel-cobalt-manganese composite hydroxide particles, whereby the surfaces thereof can be uniformly coated with the additive element M. In this case, an alkoxide solution of the additive element M may be used in place of the aqueous solution containing the additive element M.

Another method is such that an aqueous solution or slurry containing an additive element M is sprayed on nickel-cobalt-manganese composite hydroxide particles and dried, whereby the surfaces of the nickel-cobalt-manganese composite hydroxide particles can be coated with the additive element M. Alternatively, the surfaces of the nickel-cobalt-manganese composite hydroxide particles can be coated with the additive element M by a method of spraying and drying a slurry in which nickel-cobalt-manganese composite hydroxide particles and a salt containing one kind of additive elements M or more are suspended, or a method for mixing the composite hydroxide with a salt containing one kind of additive elements M or more by a solid phase method.

It should be noted that, in the case where the surfaces of nickel-cobalt-manganese composite hydroxide particles are coated with an additive element M, an atomic ratio of additive element ions which are present in a mixed solution is in advance made smaller by the coating amount, whereby the atomic ratio corresponds to an atomic ratio of metal ions of obtained composite hydroxide particles. Furthermore, in the case where nickel-cobalt-manganese composite hydroxide is heat-treated, the process of coating the surfaces of nickel-cobalt-manganese composite hydroxid particles with an additive element M may be performed after the heat treatment of the particles. Coating the surfaces of nickel-cobalt-manganese composite hydroxide particles with an additive element M allows the concentration of the additive element M in the surfaces of positive electrode active material particles to be higher than in the interior of the particles.

In the crystallization step, neither too few nor too many minute particles are present and crystals thereof grow, whereby nickel-cobalt-manganese composite hydroxide having a low specific surface area and a tap density of preferably not less than 2.0 g/cm$^3$, more preferably 2.0 to 2.5 g/cm$^3$ is obtained.

The reaction method in the above-mentioned crystallization step is not particularly limited and a batch method may be employed as the reaction method, but, in view of productivity and stability, a continuous method is preferable; the continuous method is such that a mixed solution, a solution containing an ammonium ion supply source, and a caustic alkaline solution are continuously supplied, and a reaction solution containing nickel-cobalt-manganese composite hydroxide particles is continuously overflowed from a reaction vessel, whereby the nickel-cobalt-manganese composite hydroxide particles are collected. Each of the metal salts contained in the mixed solution may be individually supplied as the individual single-salt solution.

In the case of the continuous method, it is preferable that, with a temperature being kept constant, a fixed amount of the mixed solution and the ammonium ion supply source are supplied to a reaction vessel, and also a caustic alkaline solution is added thereto to control pH, and the interior of the reaction vessel reaches a stationary state, and then formed particles are continuously collected from an overflow pipe. Alternatively, the mixed solution and a caustic alkaline solution may be mixed in advance and then supplied to a reaction vessel, but, in order to prevent nickel-cobalt-manganese composite hydroxide from being formed in the mixed solution at the time of mixing the mixed solution with the caustic alkali solution, the mixed solution and the caustic alkaline solution are preferably separately supplied to a reaction vessel.

In the case where either reaction method is applied, sufficient stirring is preferably performed to maintain a uniform reaction during the crystallization. However, excessive stirring causes more oxygen to be easily caught in, whereby sometimes metallic elements in a reaction solution are oxidized and development of primary particles is inhibited, and therefore stirring is preferably performed to such an extent that a reaction can be sufficiently uniformly maintained. Furthermore, water to be used for the crystallization step is preferably water containing minimum impurities, such as pure water, to prevent impurities from being mixed in. In order to control oxidation, it is preferable that, for example, an injection nozzle serving as a feed opening is put into the reaction solution so as to directly supply the mixed solution to the reaction solution.

(2-2. Solid-Liquid Separation Step)

Next, there is performed a solid-liquid separation step wherein nickel-cobalt-manganese composite hydroxide particles obtained by the crystallization are solid-liquid separated, and then washed. In this solid-liquid separation step, for example, the nickel-cobalt-manganese composite hydroxide particles are filtrated and then washed to obtain a filtrated material. It should be noted that the filtration of the nickel-cobalt-manganese composite hydroxide particles may be performed after being washed.

As a method for solid-liquid separation, a method commonly used is beneficial, and for example, a centrifuge, a suction filter, or the like may be used. Furthermore, washing may be performed by a common method, and a method of removing an excessive base contained in the nickel-cobalt-manganese composite hydroxide particles and ammonia is beneficial. Water to be used for the washing is preferably water containing minimum impurities, such as pure water, to prevent impurities from being mixed in.

(2-3. Drying Step)

Next, there is performed a drying step of drying the nickel-cobalt-manganese composite hydroxide particles obtained after the solid-liquid separation. In the drying step, drying is performed at a drying temperature of 100 to 230 degrees C. Thus, nickel-cobalt-manganese composite hydroxide having a low specific surface area and a low carbon-content is obtained.

Here, the drying temperature is a material temperature, that is, the highest temperature of the nickel-cobalt-manganese composite hydroxide particles to be dried. At the time of the drying, it takes time to raise the temperature of the nickel-cobalt-manganese composite hydroxide particles to be dried, and therefore, immediately after the start of drying, the temperature of the particles does not correspond to the temperature of the atmosphere, but, the temperature of the nickel-cobalt-manganese composite hydroxide particles increases to almost the temperature of the atmosphere and the particles have the highest temperature thereof. The specific surface area is greatly affected by the control of the highest temperature which the nickel-cobalt-manganese composite hydroxide particles attains and the control of time for the nickel-cobalt-manganese composite hydroxide particles to have the highest temperature, and therefore the control of the temperature of the particles allows a specific surface area to be in a range of 1.0 to 10.0 m$^2$/g. Sometimes, the highest temperature does not correspond to the temperature of the atmosphere, but, as long as the difference is not more than 10 degrees C., preferably not more than 5 degrees C., it is acceptable.

In the case where the drying temperature is less than 100 degrees C., minute hydroxide particles are additionally formed on the surfaces of the nickel-cobalt-manganese composite hydroxide particles, and as a result, the nickel-cobaltmanganese composite hydroxide has a specific surface area of more than 10.0 m²/g. On the other hand, in the case where the drying temperature is more than 230 degrees C., decomposition of the nickel-cobalt-manganese composite hydroxide proceeds, whereby too much amount of oxide is mixed in. If too much amount of oxide is mixed in, the metal content of nickel or the like per mass is changed depending on the amount of oxide mixed in, and therefore it is difficult to correctly blend nickel-cobalt-manganese composite hydroxide with a lithium compound in the manufacturing process of a positive electrode active material, whereby it becomes difficult to achieve sufficient battery characteristics of the obtained positive electrode active material. Therefore, the drying temperature is set in a range of 100 to 230 degrees C. so that the mixing-in of oxide is controlled, nickel-cobalt-manganese composite hydroxide has a specific surface area of not more than 10.0 m²/g and a carbon content of not more than 0.1% by mass.

Moreover, the drying time is not particularly limited, but suitably determined, and, when a drying temperature is regarded as T (C.°), the drying temperature is set so that the time required to reach the drying temperature is not more than $(500/T)$ minutes, preferably not more than $((500/T)-0.5)$ minutes. When the time required to reach the drying temperature is more than $(500/T)$ minutes, minute hydroxide particles are newly formed on the surfaces of the nickel-cobalt-manganese composite hydroxide particles and the nickel-cobalt-manganese composite hydroxide has a specific surface area of more than 10.0 m/g, and also carbon-containing gas, such as carbon dioxide gas in the dry atmosphere, adsorbs on the surfaces of the composite hydroxide particles, whereby the carbon content sometimes exceeds 0.1% by mass. Furthermore, in order for the nickel-cobalt-manganese composite hydroxide to have a specific surface area of less than 8.0 m²/g, the time required to reach the drying temperature is preferably not more than $((500/T)-0.5)$ minutes. Furthermore, with such drying time condition, the lower limit of the specific surface area is 1.0 m²/g.

As a dryer used for the drying step, a dryer commonly used and satisfying the drying conditions is beneficial, and any of a still-standing type, a circulating type, and an air-current type dryer may be used. In the case of a heating type dryer, an electric heating type not causing an increase in carbon-containing gas in the atmosphere may be preferably used.

Such drying step allows the adsorption of the carbon-containing gas to be controlled, and therefore an inert atmosphere, which leads to a high cost, does not have to be used, and drying can be performed in the air atmosphere which contains carbon-containing gas within a usual range. In order to set the drying time to not more than $(500/T)$ minutes, for example, a steam generated by circulating the atmosphere is preferably removed from the inside of a dryer. In a vacuum atmosphere, the drying time tends to be longer, and therefore a dryer, such as a circulation type dryer, is preferably used so that drying can be performed under the above-mentioned conditions.

As mentioned above, in the method for manufacturing nickel-cobalt-manganese, a mixed solution containing at least nickel salt, cobalt salt, and manganese salt and a solution containing an ammonium ion supply source are fed into a reaction vessel to be mixed, and also a caustic alkaline solution is fed thereinto so as to maintain a pH of 11 to 13 on a basis of liquid temperature of 25 degrees C., whereby a reaction solution is prepared, and then, with the oxygen concentration of an atmosphere, in a reaction vessel, in contact with an open surface of the reaction solution being maintained at not more than 0.2% by volume, nickel-cobalt-manganese composite hydroxide particles are crystallized in the reaction solution, and then the crystallized nickel-cobalt-manganese composite hydroxide particles are solid-liquid separated, water-washed, and dried. According to such method for manufacturing nickel-cobalt-manganese composite hydroxide, there can be obtained nickel-cobalt-manganese composite hydroxide which is represented by a general formula: $Ni_{1-x-y-z}Co_xMn_yM_z(OH)_2$ (wherein $0<x\leq1/3$, $0<y\leq1/3$, $0\leq z\leq0.1$, and M is at least one element selected from Mg, Al, Ca, Ti, V, Cr, Zr, Nb, Mo, and W) and has a specific surface area of 1.0 to 10.0 m²/g, a carbon content of not more than 0.1% by mass, and a half-value width of the (101) plane in X-ray diffraction of not more than 1.5°. The obtained nickel-cobalt-manganese composite hydroxide has a low specific surface area and a low carbon-content, and does not become coarse even when a lithium compound or the like is sintered, and therefore allows a positive electrode active material being excellent in thermal stability, having a high density, and being capable of improving battery characteristics to be manufactured.

Furthermore, a battery using a positive electrode active material manufactured by the obtained nickel-cobalt-manganese composite hydroxide has a high capacity and a good cycle characteristic and is excellent in battery characteristics and safety.

EXAMPLES

Hereinafter, Examples according to the present invention will be described, but the present invention is not limited to these examples. Methods for evaluating nickel-cobalt-manganese hydroxide used in Examples and Comparative Examples and a positive electrode active material for non-aqueous electrolyte secondary batteries are as follows.

(1) Analysis of Metal Component:

Metal components were analyzed by ICP emission analysis by using an ICP emission analysis apparatus (725ES, manufactured by Varian, Inc.).

(2) Analysis of Ammonium Ion Concentration:

Ammonium ion concentration was measured by a distillation method in accordance with JIS standards.

(3) Measurement of BET Specific Surface Area:

A BET specific surface area was measured by a single-point BET gas absorption method by using a specific surface area measuring apparatus (Multisorb 16, manufactured by Yuasa Ionics Co., Ltd.).

(4) Measurement of Carbon Content:

A carbon content was measured by a high frequency combustion infrared absorption method by using a carbon-sulfur analysis apparatus (CS-600, manufactured by LECO Corporation).

(5) Measurement of Average Particle Diameter and Evaluation of Particle-Size Distribution Width:

By using a laser diffraction particle size analyzer (Microtrac HRA, manufactured by Nikkiso Co., Ltd.), an average particle diameter was measured and a particle-size distribution width was evaluated.

(6) Measurement of Half-Value Width of (101) Plane

The half-value width of the (101) plane was measured by using an X-ray diffractometer (X'Pert PRO, manufactured by PANalytical B.V.).

(7) Observation Evaluation of Shape and Appearance:

Observation evaluation of shape and appearance was performed by using a scanning electron microscope (JSM-6360LA, manufactured by JEOL Ltd., hereinafter referred to as SEM).

(8) Measurement of Tap Density:

A tap density was measured in accordance with JIS R 1628.

Example 1

In Example 1, 32 L of industrial water and 1300 ml of 25%-by-mass ammonia water were fed into an overflow type crystallization reaction tank having a volume of 34 L and with four baffle plates attached thereto, and heated to 50 degrees C. by a thermostat and a heating jacket, and then a 24%-by-mass caustic soda solution was added thereto, whereby the pH of a reaction solution in the thermostat was adjusted to 10.9 to 11.1. The above-mentioned pH is a pH at a temperature of 50 degrees C., and therefore, in order to control the pH precisely, the reaction solution was taken and cooled to 25 degrees C. and the pH was measured, then the pH at a liquid temperature of 50 degrees C. was adjusted so that pH at a liquid temperature of 25 degrees C. was 11.7 to 11.9.

A lid made of resin was attached to the crystallization reaction tank so that the tank was able to be sealed, and sealing was provided to a stirring shaft penetration portion to maintain sealing performance. Nitrogen gas was supplied to this crystallization reaction tank at 2.0 L/minute thereby to reduce the oxygen concentration inside the reaction system. The oxygen concentration of a space portion in the crystallization reaction tank, the portion being in contact with the reaction solution, was measured by a diaphragm galvanic cell type oxygen sensor and the oxygen concentration was confirmed to be reduced to 0.15% by volume, and then a crystallization reaction was started.

Next, while the reaction solution maintained at 50 degrees C. being stirred, a mixed solution of nickel sulfate, cobalt sulfate, and manganese sulfate having a nickel concentration of 1.00 mol/L, a cobalt concentration of 0.40 mol/L, and a manganese concentration of 0.60 mol/L (Ni:Co:Mn=0.5:0.2:0.3 at metal element molar ratio, hereinafter referred to a mixed solution.) and also 25%-by-mass ammonia water were continuously supplied at 30 ml/minute and 2.5 ml/minute, respectively, by using a metering pump, and furthermore, a 24%-by-mass caustic soda solution was added thereto, whereby pH at a liquid temperature of 25 degrees C. and the ammonium ion concentration were controlled to pH 11.7 to 11.9 and 7 to 13 g/L, respectively, and a crystallization reaction was thus performed.

Stirring here was performed by using a six-bladed turbine blade having a diameter of 10 cm by making the blade horizontally revolve at 1200 rpm. A method for supplying the mixed solution to the reaction system was such that an injection nozzle serving as a feed opening was put into the reaction solution, whereby the mixed solution was directly supplied to the reaction solution.

Nickel-cobalt-manganese composite hydroxide particles formed by the crystallization reaction were continuously collected by overflow. The nickel-cobalt-manganese composite hydroxide particles collected over a period of 48 to 72 hours after the start of the reaction, wherein the reaction was stabilized, were suitably solid-liquid separated, water-washed, and dried at 100 degrees C. for 24 hours, whereby a nickel-cobalt-manganese composite hydroxide powder was obtained. The time to reach a temperature of (predetermined drying temperature −5) degrees C. was 3.5 minutes.

The obtained nickel-cobalt-manganese composite hydroxide had a composition of 31.6%-by-mass nickel, 12.7%-by-mass cobalt, and 17.8%-by-mass manganese and had an atomic ratio of Ni:Co:Mn of 49.9:20.0:30.1, which was almost equal to the composition ratio of the raw material solution. Furthermore, the nickel-cobalt-manganese composite hydroxide had a specific surface area of 5.2 $m^2/g$, a carbon content of 0.05% by mass, a half-value width of the (101) plane of 1.1870, and a tap density of 2.31 $g/cm^3$. The nickel-cobalt-manganese composite hydroxide had an average particle diameter of 10.6 μm, and, by observation of the shape and appearance of the composite hydroxide particles, the particles were confirmed to be approximately sphere shaped particles, and furthermore, by observation of the section of the particles, the particles were confirmed to be formed of closely-packed crystals.

Example 2

In Example 2, nickel-cobalt-manganese composite hydroxide was obtained in the same manner as in Example 1, except that the amount of nitrogen gas supplied to the crystallization reaction tank was 3.0 L/minute, and the oxygen concentration of the space portion in the crystallization reaction tank was 0.1% by volume.

The obtained nickel-cobalt-manganese composite hydroxide had a specific surface area of 4.3 $m^2/g$, a carbon content of 0.03% by mass, a half-value width of the (101) plane of 1.0430, and a tap density of 2.27 $g/cm^3$. Also, the nickel-cobalt-manganese composite hydroxide had an average particle diameter of 10.8 μm, and was confirmed to be particles which were approximately sphere shaped and formed of closely-packed crystals.

Example 3

In Example 3, nickel-cobalt-manganese composite hydroxide was obtained in the same manner as in Example 1, except that the amount of nitrogen gas supplied to the crystallization reaction tank was 5.0 L/minute, and the oxygen concentration of the space portion in the crystallization reaction tank was 0.04% by volume.

The obtained nickel-cobalt-manganese composite hydroxide had a specific surface area of 3.7 $m^2/g$, a carbon content of 0.02% by mass, a half-value width of the (101) plane of 0.8640, and a tap density of 2.25 $g/cm^3$. Also, the nickel-cobalt-manganese composite hydroxide had an average particle diameter of 10.7 μm, and was confirmed to be particles which were approximately sphere shaped and formed of closely-packed crystals.

Example 4

In Example 4, nickel-cobalt-manganese composite hydroxide was obtained in the same manner as in Example 1, except that the amount of nitrogen gas supplied to the crystallization reaction tank was 1.0 L/minute, and the oxygen concentration of the space portion in the crystallization reaction tank was 0.19% by volume.

The obtained nickel-cobalt-manganese composite hydroxide had a specific surface area of 7.6 $m^2/g$, a carbon content of 0.08% by mass, a half-value width of the (101) plane of 1.433°, and a tap density of 2.26 $g/cm^3$. Also, the nickel-cobalt-manganese composite hydroxide had an average particle diameter of 10.5 μm, and was confirmed to be particles which were approximately sphere shaped and formed of closely-packed crystals.

Comparative Example 1

In Comparative Example 1, nickel-cobalt-manganese composite hydroxide was obtained in the same manner as in Example 1, except that the amount of nitrogen gas supplied to the crystallization reaction tank was 0.8 L/minute, and the oxygen concentration of the space portion in the crystallization reaction tank was 0.24% by volume.

The obtained nickel-cobalt-manganese composite hydroxide had a specific surface area of 11.2 m²/g, a carbon content of 0.11% by mass, a half-value width of the (101) plane of 1.532°, and a tap density of 2.19 g/cm³. Also, the nickel-cobalt-manganese composite hydroxide had an average particle diameter of 10.5 μm, and was confirmed to be particles which were approximately sphere shaped and formed of closely-packed crystals.

Comparative Example 2

In Comparative Example 2, nickel-cobalt-manganese composite hydroxide was obtained in the same manner as in Example 1, except that the amount of nitrogen gas supplied to the crystallization reaction tank was 0.5 L/minute, and the oxygen concentration of the space portion in the crystallization reaction tank was 0.4% by volume.

The obtained nickel-cobalt-manganese composite hydroxide had a specific surface area of 13.8 m²/g, a carbon content of 0.13% by mass, a half-value width of the (101) plane of 1.612°, and a tap density of 2.20 g/cm³. Also, the nickel-cobalt-manganese composite hydroxide had an average particle diameter of 10.6 μm, and was confirmed to be particles which were approximately sphere shaped and formed of closely-packed crystals.

Comparative Example 3

In Comparative Example 3, nickel-cobalt-manganese composite hydroxide was obtained in the same manner as in Example 1, except that the amount of nitrogen gas supplied to the crystallization reaction tank was 0.2 L/minute, and the oxygen concentration of the space portion in the crystallization reaction tank was 0.6% by volume.

The obtained nickel-cobalt-manganese composite hydroxide had a specific surface area of 15.6 m²/g, a carbon content of 0.15% by mass, a half-value width of the (101) plane of 1.765°, and a tap density of 2.17 g/cm³. Also, the nickel-cobalt-manganese composite hydroxide had an average particle diameter of 10.2 μm, and was confirmed to be particles which were approximately sphere shaped and formed of closely-packed crystals.

Comparative Example 4

In Comparative Example 4, nickel-cobalt-manganese composite hydroxide was obtained in the same manner as in Example 1, except that nitrogen gas was not supplied to the crystallization reaction tank. It should be noted that the oxygen concentration of the space portion in the crystallization reaction tank was 12.3% by volume.

The obtained nickel-cobalt-manganese composite hydroxide had a specific surface area of 18.3 m²/g, a carbon content of 0.21% by mass, a half-value width of the (101) plane of 2.121°, and a tap density of 2.20 g/cm³. Also, the nickel-cobalt-manganese composite hydroxide had an average particle diameter of 10.3 μm, and was confirmed to be particles which were approximately sphere shaped and formed of closely-packed crystals.

Figure 2:
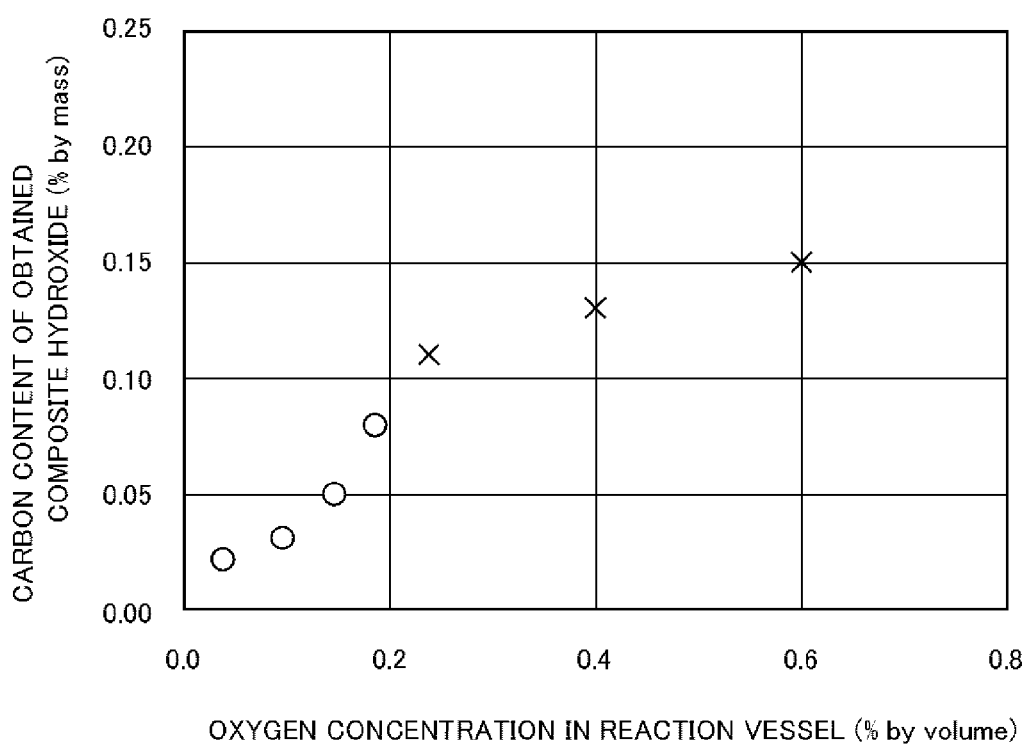
FIG. 2 is a graph showing a relationship between an oxygen concentration in a reaction vessel and a carbon content of nickel-cobalt-manganese composite hydroxide.

FIG. 1 shows a relationship between an oxygen concentration in a reaction vessel and a specific surface area of nickel-cobalt-manganese composite hydroxide, each of which was obtained in Examples 1 to 4 and Comparative Examples 1 to 3, on the other hand, FIG. 2 shows a relationship between an oxygen concentration in a reaction vessel and a carbon content of nickel-cobalt-manganese composite hydroxide. In FIG. 1 and FIG. 2, ○ represents Examples 1 to 4 and X represents Comparative Examples 1 to 3. It should be noted that Comparative Example 4 had a very high oxygen concentration, that is, 12.3% by volume and therefore is not shown in FIG. 1 and FIG. 2.

The results shown in FIG. 1 and FIG. 2 indicates that, in Examples 1 to 4 in which the oxygen concentration in the reaction tank, that is, the oxygen content of an atmosphere in the reaction vessel, the atmosphere being in contact with the reaction solution, was controlled to not more than 0.2% by volume, the obtained nickel-cobalt-manganese composite hydroxide had a specific surface area of less than 10.0 m²/g and also a carbon content of not more than 0.1% by mass. Furthermore, as mentioned above, Examples 1 to 4 had a half-value width of the (101) plane of not more than 1.5°.

On the other hand, the results shown in FIG. 1 and FIG. 2 indicates that Comparative Examples 1 to 3, each having an oxygen content of more than 0.2% by volume, had a specific surface area of more than 10.0 m²/g and also a carbon content of more than 0.1% by mass. Furthermore, as mentioned above, Comparative Examples 1 to 4 had a half-value width of the (101) plane of more than 1.5°.

Therefore, from the results in these Examples and Comparative Examples, it was understood that the control of the oxygen concentration in a reaction vessel to not more than 0.2% by volume allows nickel-cobalt-manganese composite hydroxide having a specific surface area of less than 10.0 m²/g, a carbon content of not more than 0.1% by mass, and a half-value width of the (101) plane of not more than 1.5° to be obtained.

The invention claimed is:

1. Nickel-cobalt-manganese composite hydroxide, being represented by a general formula: $Ni_{1-x-y-z}Co_xMn_yM_z(OH)_2$ (wherein $0<x\leq1/3$, $0<y\leq1/3$, $0\leq z\leq0.1$, and M is one kind of element or more selected from Mg, Al, Ca, Ti, V, Cr, Zr, Nb, Mo, and W) and serving as a precursor of a positive electrode active material for nonaqueous electrolyte secondary batteries, wherein
the nickel-cobalt-manganese composite hydroxide has a specific surface area of 1.0 to 10.0 m²/g, the specific surface area being measured by a nitrogen adsorption BET method; a carbon content of not more than 0.1% by mass, the carbon content being measured by a high frequency combustion infrared absorption method; and a half-value width of a (101) plane in X-ray diffraction of not more than 1.5°.

2. Nickel-cobalt-manganese composite hydroxide according to claim 1, wherein the specific surface area is not less than 1.0 m²/g and less than 8.0 m²/g.

3. A method for manufacturing nickel-cobalt-manganese composite hydroxide,
the nickel-cobalt-manganese composite hydroxide being represented by a general formula: $Ni_{1-x-y-z}Co_xMn_yM_z(OH)_2$ (wherein $0<x\leq1/3$, $0<y\leq1/3$, $0\leq z\leq0.1$, and M is one kind of element or more selected from Mg, Al, Ca, Ti, V, Cr, Zr, Nb, Mo, and W) and serving as a precursor of a positive electrode active material for nonaqueous electrolyte secondary batteries,
the method comprising:
a crystallization step wherein a mixed solution containing at least nickel salt, cobalt salt, and manganese salt and a solution containing an ammonium ion supply source are fed into a reaction vessel to be mixed, and also a caustic alkaline solution is fed thereinto so as to maintain a pH of 11 to 13 on a basis of liquid temperature of 25 degrees C., whereby a reaction solution is prepared, and nickel-cobalt-manganese composite hydroxide particles are crystallized in said reaction solution;

a solid-liquid separation step wherein the crystallized nickel-cobalt-manganese composite hydroxide particles are solid-liquid separated and water-washed; and a drying step wherein the washed nickel-cobalt-manganese composite hydroxide particles are dried, wherein, in the crystallization step, an oxygen concentration of an atmosphere in a reaction vessel, the atmosphere being in contact with an open surface of the reaction solution, is maintained at not more than 0.2% by volume.

4. The method for manufacturing nickel-cobalt-manganese composite hydroxide according to claim 3, wherein the reaction solution has an ammonium ion concentration maintained in a range of 5 to 20 g/L.

5. The method for manufacturing nickel-cobalt-manganese composite hydroxide according to claim 3, wherein the reaction solution has a temperature maintained in a range of 20 to 70 degrees C.

6. The method for manufacturing nickel-cobalt-manganese composite hydroxide according to claim 3, wherein the oxygen concentration is maintained at not more than 0.2% by volume by feeding inert gas into the reaction vessel.

7. The method for manufacturing nickel-cobalt-manganese composite hydroxide according to claim 3, wherein each of the mixed solution and the solution containing an ammonium ion supply source is continuously supplied, and a reaction solution containing nickel-cobalt-manganese composite hydroxide particles is continuously overflowed from the reaction vessel, whereby nickel-cobalt-manganese composite hydroxide particles are collected.

8. The method for manufacturing nickel-cobalt-manganese composite hydroxide according to claim 3, wherein surfaces of the nickel-cobalt-manganese composite hydroxide particles obtained by the crystallization step are coated with the element M.

9. The method for manufacturing nickel-cobalt-manganese composite hydroxide according to claim 3, wherein the nickel salt, the cobalt salt, and the manganese salt are at least one of sulfate, nitrate, and chloride.

10. The method for manufacturing nickel-cobalt-manganese composite hydroxide according to claim 3, wherein the ammonium ion supply source is at least one of ammonia, ammonium sulfate, and ammonium chloride.

\* \* \* \* \*